United States Patent [19]

Friedland et al.

[11] Patent Number: 4,755,671

[45] Date of Patent: Jul. 5, 1988

[54] METHOD AND APPARATUS FOR SEPARATING IONS OF DIFFERING CHARGE-TO-MASS RATIO

[75] Inventors: Lazar Friedland, Jerusalem; Michael Geva, Kibbutz Givat Hayim Meuchad; Jay Hirshfield, Jerusalem, all of Israel

[73] Assignee: Isomed, Inc., Hamden, Conn.

[21] Appl. No.: 824,828

[22] Filed: Jan. 31, 1986

[51] Int. Cl.$^4$ .............................................. H01J 49/30
[52] U.S. Cl. ................................... 250/298; 250/281; 250/282
[58] Field of Search ...................... 250/298, 281, 282

[56] References Cited

U.S. PATENT DOCUMENTS

| | | | |
|---|---|---|---|
| 3,845,300 | 4/1973 | Roehling et al. | 250/282 |
| 3,992,625 | 11/1976 | Schmidt et al. | 250/284 |
| 4,059,761 | 11/1977 | Dawson | 250/287 |
| 4,066,893 | 1/1978 | Dawson | 250/282 |
| 4,081,677 | 3/1978 | Dawson | 250/282 |

FOREIGN PATENT DOCUMENTS

84/02803 7/1984 PCT Int'l Appl. .

OTHER PUBLICATIONS

Chesterton, *Electric and Magnetic Fields*, p. 323.
Jackson, *Classical Electrodynamics*, p. 581.
Lehnert, *Dynamics of Charged Particles*, 1969, p. 16.

*Primary Examiner*—Craig E. Church
*Assistant Examiner*—Jack I. Berman
*Attorney, Agent, or Firm*—Armstrong, Nikaido, Marmelstein & Kubovcik

[57] ABSTRACT

A method and apparatus for separating plural isotopes of a chemical substance is disclosed. The apparatus comprises a first magnetic field generating device for generating a uniform axial first magnetic field and a second magnetic field generating device such as a wiggler for generating a non-uniform, twisted, second magnetic field. An ion source provides a stream of ions of isotopes to be separated, the stream passing through the first and second magnetic fields. Ions of different charge-to-mass ratio will follow different trajectories or paths through the magnetic fields. A collector is positioned with respect to the second magnetic field generating device such that only the ions of isotopes to be collected strike the collector means and are collected thereon. The method includes generating the first and second magnetic fields and passing a stream of ions to be separated through the first and second magnetic field, whereby ions of different charge-to-mass ratio travel along different predetermined paths or trajectories. The ions of the isotope following at least one of the predetermined paths are then collected.

14 Claims, No Drawings

METHOD AND APPARATUS FOR SEPARATING IONS OF DIFFERING CHARGE-TO-MASS RATIO

BACKGROUND OF THE INVENTION

1. Field of the Invention

The present invention is directed to a method and apparatus for separating ions of differing charge-to-mass ratio and more particularly to a method and apparatus of separating ions of differing charge-to-mass ratio utilizing the principle of the stability of orbital motion of an ion in certain magnetic field configurations.

2. Description of the Prior Art

The propagation of a relativistic electron beam in a transverse periodic magnetic structure is known. In the study of the electron beams in magnetic fields in a free electron laser, the most frequently used periodic magnetic field is the transverse field produced on the axis of a double helical current winding with equal and opposite currents in each helix. Such a device is usually referred to as a magnetic wiggler. The unperturbed motion of the electrons of the beam in the wiggler is quite simple. The reason for simplicity is that the magnetic field on the axis of a wiggler can be approximately described by a transverse vector potential $A_\perp(z)$, depending only on the distance z along the axis. Therefore, the canonical transverse momentum $$\vec{P}_\perp = \gamma m \vec{v}_\perp - (e/c)\vec{A}_\perp \qquad (1)$$

of an electron is a constant of motion, which with the conservation of energy $$\gamma = [1-(v_\perp/c)^2-(v_z/c)^2]^{-\frac{1}{2}} = \text{const}, \qquad (2)$$

uniquely defines the perpendicular and parallel components $v_\perp$ and $v_z$ of the velocity of the electrons in the beam for a given assignment of $A_\perp(z)$. The electrons in the magnetic wiggler have helical trajectories with the same period as that of the wiggler.

The magnetic field produced by the wiggler can be described by the equations $$\vec{B} = \nabla \times \vec{A}_\perp, \text{ where} \qquad (3)$$

$$\vec{A}_\perp A_\perp(z) [\hat{e}_x \cos k(z)z - \hat{e}_y \sin k(z) z], \qquad (4)$$

where k(z) is the slowly varying wavenumber of the wiggler field.

If an axial magnetic field $B_o(z)$ has been added, it can alter dramtically the orbit as compared to the orbit in a wiggler without $B_o(z)$. For $\vec{A}_\perp$ and k independent of z, the vector potential in equation (4) describes the field on the axis of an infinite magnetic wiggler, where, as is well-known.

$$A_\perp = I[ak\ K_o(ak) + K_1(ak)], \qquad (5)$$

where I is the current in the wiggler, a is its radius, $$k = \frac{2\pi}{\lambda},$$

λ is the pitch of the winding of the wiggler, and $K_o$ and $K_1$ are the modified Bessel functions of the second kind. By using the more general form of equation (4) for the vector potential, slow variations of the wiggler parameters a and k with z can be obtained, and the magnitude $A_\perp(z)$ in equation (4) can be approximated by equation (5), where a and k correspond to the values of these parameters in the non-uniform wiggler at point z.

Although the magnetic field represented by the potential (4) does not satisfy $\nabla \times \vec{B} = 0$, it gives a good approximation of the exact curl-free field on an infinite wiggler at small distances r from its axis.

The electron beam dynamics are described in more detail in Friedland, "Electron Beam Dynamics in Combined Guide and Pump Magnetic Fields for Free Electron Laser Applications"; *Physics Fluids*, Volume 23, Number 12, December 1980; pages 2376-2382; said article being incorporated herein by reference.

Although the dynamics of electron beams in magnetic fields generated by a wiggler have been studied, the application of the physical principles involved has not been extended to other ionized particles of matter. Further, the application of the principles involved to the separation of ionized particles having different charge-to-mass ratios has not been studied heretofor.

SUMMARY OF THE INVENTION

It is the primary object of the present invention to provide a method and apparatus for separating ions of a chemical element by passing a beam of ions through a magnetic field in which ions of different charge-to-mass ratio will follow different trajectories.

It is another object of the present invention to pass a beam of a plurality of ions of a chemical substance through a magnetic field generated by a wiggler wherein, ions of different charge-to-mass ratios will follow different paraxial trajectories.

It is still another object of the present invention to pass a beam of plurality of ions of isotopes of a chemical substance through a magnetic field generated by a wiggler coil such that, the ions of each isotope will follow a different trajectory wherein, a collector is positioned with respect to a predetermined trajectory to collect the ions following that trajectory.

It is still another object of the present invention to provide a method and apparatus for isotope separation which does not require exotic laser excitation or expensive RF sources.

It is still a further object of the present invention to provide a method and apparatus which will separate isotopes of different chemical substances.

The present invention is directed to an apparatus for separating plural isotopes of a chemical element, the apparatus comprising a first magnetic field generating means for generating a uniform, axial, first magnetic field and a second magnetic field generating means, such as a wiggler, for generating a non-uniform, twisted, second magnetic field. An ion source provides a stream of ions of the isotopes to be separated, the stream of ions passing through the first and second magnetic fields. Ions of different charge-to-mass ratio will follow different trajectories or paths through the magnetic fields. A collector means is positioned with respect to the second magnetic field generating means such that only the ions of the isotope to be collected strike the collector means and are collected thereon.

The present invention is also directed to a method of separating chemical elements or isotopes thereof, the method comprising the steps of generating a uniform, axial, first magnetic field and a non-uniform, twisted, second magnetic field. A stream of ions of the chemical elements or isotopes to be separated is generated and is passed through the first and second magnetic fields whereby, ions of different charge-to-mass ratio travel along different paths or trajectories. The ions of the isotope following at least one of the predetermined paths are collected.

BRIEF DESCRIPTION OF THE DRAWINGS

FIG. 1 is a graph showing the wiggler magnetic field which is generated in connection with the present invention.

FIG. 2 illustrates the trajectory followed by ions of isotopes of hydrogen when a beam of such ions is subjected to a magnetic field generated in accordance with the present invention.

FIG. 3 illustrates the trajectory followed by ions of isotopes of carbon when a beam of such ions is subjected to a magnetic field generated in accordance with the present invention.

FIG. 4 is a schematic drawing illustrating the apparatus of the present invention.

FIGS. 5a and 5b illustrate magnetic wigglers used in connection with the present invention.

FIG. 6 is a graph showing regions of stable and unstable states.

DETAILED DESCRIPTION OF THE PREFERRED EMBODIMENT

The basic principle upon which the separation of isotopes depends, in accordance with the present invention is the stability of orbital motion of an ion in particular types of static magnetic field configurations. Applying this principle, ions of a given charge-to-mass ratio will execute regular paraxial trajectories in these fields and ions with close values of charge-to-mass will follow orbits which gyrate widely about the axis. The ions will therefore separate themselves physically from an isotopically mixed incoming stream of ions.

Orbits for ions in a uniform static magnetic field $\vec{B} = \hat{e}_z B_o$ are given by the well-known equations $$x = x_o + r\cos(\Omega t - kz + \phi_o)$$

$$y = y_o + r\sin(\Omega t - kz + \phi_o)$$

and $$z = z_o + v_o t,$$

where $\Omega = ZeB_o/M$ is the ion's cyclotron frequency, $v_o$ is the uniform axial velocity, $k = \Omega/v_o$ is the axial wavenumber ($2\pi$/pitch) for the orbit, and $r = v_\perp/\Omega$ is the orbit radius for a perpendicular velocity $v_\perp$. These orbits are helices whose radius and pitch are governed only by initial velocities ($v_o$, $v_\perp$) and by $\Omega$.

A magnetic wiggler is an arrangement of current-carrying conductors or permanent magnets which produces a magnetic field which can be approximated near the axis as $B_x = B_\perp \cos kz$, $B_y = B_\perp \sin kz$, and $B_z = 0$. Orbits for ions in such a field, for an initial velocity ($v_o$, 0) outside of the wiggler are given by $$v_x = (ZeB_\perp/kM)\cos kz$$

$$v_y = (ZeB_\perp/kM)\sin kz$$

and $$v_z^2 = v_o^2 - (ZeB_\perp/kM)^2.$$

These are also helical orbits, but the parameters depend upon the wiggler field strength and pitch.

If the wiggler field is superimposed upon a uniform axial field, the orbits follow a much more complicated pattern. This situation was analyzed in detail by Friedland for electron orbits with application to certain free-electron laser configurations. This analysis may be applied to ions, by substituting the ion's M/Z for the electron's mass m in the equations, and replacing the electron charge e by $-e$.

The single-particle equations of motion predict, for ions which enter adiabatically into a wiggler in a uniform axial magnetic field, that some orbits are nearly helical with small transverse displacements. Conversely, orbits also exist with very large (and sometimes highly irregular) transverse displacements. A simple stability criterion determines which situation will prevail, depending upon whether the uniform axial magnetic field $B_o$ exceeds a critical value $B_{cr}(2MV/Ze)^{\frac{1}{2}}\alpha^{3/2} k/c$, with $\alpha = 1 - (ZeB_\perp^2/2k^2Mc^2V)^{1/3}$ and V is the initial ion energy expressed in volts (assumed to be purely axial). If $B_o/B_{cr} > 1$, then the orbit is unstable and the ion moves with large off-axis excursions. If $B_o/B_{cr} < 1$, the orbit is stable and moves with small paraxial excursions on a nearly helical orbit. The stability of these orbits has similarities to the stability of orbits in an RF quadruple mass spectrometer.

The stability relation can be re-arranged to read $$(\lambda B_\perp)^{2/3} + (\lambda B_o)^{2/3} = 0.9376 \ (VA/Z)^{1/3} \quad (6)$$

wherein $\lambda$ is the wiggler pitch in cm, $B_o$ and $B_\perp$ are in kilogauss, V is the ion's energy in volts, and A it the ion's mass in amu. (This A is not the same as $A_\perp$, which is the vector potential in equation (1)). FIG. 6 maps equation (6) in the $B_o - B_\perp$ plane for $VA/\lambda^2 = $const., where $\bar{B}_1 = 0.9079(VA)^{\frac{1}{2}}$ kilogauss-cm. Orbits are unstable above the curve in FIG. 6 and stable below it.

The wiggler field $B_\perp$ can be obtained from the approximate formula (on axis)

$$\lambda B_\perp = (4\pi/5)I(a/\lambda)^{\frac{1}{2}}\exp(-2\pi a/\lambda)$$

where $B_\perp$ is in kilogauss, $\lambda$ in cm, I in kiloamperes and a (the coil radius) also in cm. The value of $a/\lambda$ giving maximum $\lambda B_\perp$ is $(4\pi)^{-1}$, for which $$(a/\lambda)^{\frac{1}{2}}\exp(-2\pi a/\lambda) = 0.1711$$

Thus, $$(\lambda B_\perp)_{max} = 1.3509 I \text{ kG-cm},$$

so that the threshold condition can be written $$(\lambda B_o)^{2/3} + 1.222 I^{2/3} = 0.9376(VA)^{1/3}. \quad (7)$$

Equation (7) shows that for appropriate axial magnetic field $B_o$, wiggler coil current I, and ion accelerating voltage V, and ion with mass A would be on a stable orbit, while a second ion with mass A-1 would be on an unstable orbit.

In a realizable wiggler coil, the field strength $B_\perp$ will vary in magnitude along the axis. Referring to FIG. 1, the magnitude of the twisted magnetic field $B_\perp$ rises gently from zero at large negative values of z to its maximum value at large positive values of z. For example, $$B_\perp(z) = B_{\perp 0}/(1 + e^{-z/L}). \quad (8)$$

The x component of the field follows the same curve as the y component but is shifted by 90°. The magnitude of the axial field $B_o$ is constant.

The coil to produce the field $B_o$ is a conventional air core solenoid. The field $B_\perp$ is produced using a periodic, helical, bifilar winding, with current passing in opposite directions in each winding. The configurations of this coil will be described in more detail below.

FIG. 2 shows the trajectory of isotopes of hydrogen, wherein a stream of ions having the ions hydrogen and deuterium is subjected to a magnetic field such as that described in equation (8). The mass of deuterium is twice that of hydrogen and it can be seen that the trajectory followed by the deuterium ions remains relatively close to the x axis. The trajectory of the hydrogen ions, however, follows a spiral path which very quickly moves a substantial distance from the z axis. It is very simple to position a collector which intersects the trajectory of the hydrogen ion without intersecting the trajectory of the deuterium ion or vice versa.

FIG. 3 illustrates the trajectory of carbon ions, namely carbon 12 and carbon 13. The mass of carbon 13 is 1.08 that of carbon 12. As can be seen in FIG. 3, the trajectories of the carbon 12 and carbon 13 isotopes differ substantially. A collector can be placed so that the ions of either the carbon 12 or carbon 13 strike the collector without the ions of the other element striking the collector. In this way, the isotopes may easily separated.

FIG. 4 illustrates the preferred embodiment of the apparatus of the present invention. Referring to FIG. 4, a vessel 1 is surrounded by an air core coil 3, the coil 3 generating the magnetic field $B_o$. A wiggler coil 5 is located within the vessel 1 and has an axis which is coaxial with the axis of coil 3. An ion source 7, such as a Commonwealth Scientific Corp. 3M-234, produces a stream of ions of the isotopes which are to be separated. The isotopes are fed to the ion source 7 through a gas feed pipe 9. The ion stream from the source 7 is produced initially along axis A. The magnetic field $B_o$ generated by the coil 3 and $B_1$ generated by wiggler coil 5 cause isotopes of different mass to follow different trajectories. An ion of a lighter mass will follow trajectory II. A cylindrical tubular member 11 is positioned within the wiggler coil, coaxial therewith. The ions following trajectory I have a path which is outside the cylindrical member 11 while the ions following trajectory II have a path inside the cylindrical member 11. A collector 13 may be positioned at the end of the cylindrical member 11 so that the ions of the heavier isotope will strike the collector 13. Likewise, a collector 15 can be positioned outside of the cylindrical member 11 so that the ions of the lighter isotope following trajectory I strike the collector 15. The diameter of cylindrical member 11 can be selected such that the ions following trajectory I can also be collected on the inner surface of cylindrical member 11. Further, a cylindrical member 14 can be used to collect ions following trajectory II. Thus, lighter ions can be collected on cylindrical member 14 and/or collector 15 and heavier ions can be collected on cylindrical member 11 and/or collector 13. In this manner, the isotopes are separated from one another and are collected. A vacuum is maintained within chamber 1 by means of a vacuum pump connected thereto (not shown).

FIG. 5a shows one embodiment of a wiggler coil which may be used in connection with the present invention. The wiggler coil includes a bifilar winding having windings 17a and 17b running in opposite directions. The windings are wound on a core 19 which has a variable diameter d. Although the coil is a single unit, it may be viewed as having two portions positioned adjacent to one another along the axis of the coil. In the first portion, the diameter of the turns decreases as the turns progress along the axial direction, and in the second portion the diameter of the turns increases as the turns progress in the axial direction. In other words, the diameter of the turns starts out large at one end of the coil, decreases towards the center, and then increases towards the other end. For example, a coil may have a diameter of 5 cm at the ends thereof and a diameter of 2 cm at the center.

In an alternative embodiment shown in FIG. 5b, the wiggler coil 5 has a bifilar winding with the turns 21a and 21b being wound in opposite directions. The windings are wound on a core 23. In the embodiment of FIG. 5b, the pitch of the winding varies, with the pitch of the windings being small at one end of the wiggler and gradually increasing towards the center and then gradually decreasing toward the other end. For example, on a coil having a diameter of 2 cm, the pitch ranges from 0.5 cm at the ends to 4 cm at the center. The embodiment of FIG. 5b may also be viewed as a coil having two portions, the pitch in the first portion increasing and the pitch in the second portion decreasing.

In still another embodiment, the wiggler can have a variable diameter core such as that shown in FIG. 5a and windings with a variable pitch such as that shown in FIG. 5b.

An example of the instability of orbits in a magnetic wiggler can be seen with reference to FIGS. 3 and 4. The orbits for carbon ions $^{12}C^+$ and $^{13}C^+$ enter a gently tapered wiggler in a 1.3 kG uniform axial field. The ion energy is 100 eV, the wiggler strength parameter $ZeB_\perp/kMc^2$ is 1, and $k = 0.6$ cm$^{-1}$. It can be seen that $^{12}C^+$ ions are deflected to very large radial distances (greater than 4 cm), while the $^{13}C^+$ ions move on helices of much smaller radius. An annular septum 11 with radius 2.5 cm, inserted from $z>0$ to about $z=10$ cm, serves to isolate completely the $^{12}C^+$ and $^{13}C^+$ ions. $^{13}C$ can be collected at large z. One gram of pure $^{13}C$ would ideally then be collected in 200/I hours, where I is the total carbon ion current in amperes.

The present invention may be embodied in other specific forms without departing from the spirit or essential characteristics thereof. The present disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:

1. An apparatus for separating plural isotopes of a chemical element having differing charge-to-mass ratios, said apparatus comprising:
   (a) first magnetic field generating means for generating a static, uniform, axial first magnetic field;
   (b) second magnetic field generating means for generating a static, non-uniform, twisted second magnetic field;
   (c) ion source means for producing a stream of ions of said isotopes of differing charge-to-mass ratio, said stream of isotopes passing through a said first and second static magnetic fields, wherein, the ions of each of said isotopes follows a different path and wherein said second magnetic field does not change the energy level of said ions; and (d) collector means positioned with respect to said second magnetic field generating means such that ions of less than all of said isotopes strike said collector means and are collected thereon.

2. An apparatus as set forth in claim 1, wherein said second magnetic field generating means is a wiggler means.

3. An apparatus as set forth in claim 1, including tubular means positioned coaxially with the first magnetic field, wherein, the ions of at least one of said plurality of isotopes pass through said tubular means and the ions of at least one other of said plurality of isotopes pass outside of said tubular means.

4. An apparatus as set forth in claim 1, wherein said first and second magnetic field generating means are positioned with respect to one another such that said first and second magnetic fields are coaxial in at least one dimension thereof.

5. An apparatus as set forth in claim 1, wherein said collector means comprises a plate.

6. An apparatus as set forth in claim 1, including a vacuum chamber for enclosing said ion source means and said collector means.

7. An apparatus as set forth in claim 2, wherein said wiggler means comprises a helical coil having a longitudinal axis with first and second coil portions being positioned along said longitudinal axis, and wherein the diameter of the turns of said coil decreases in said first portion and the diameter of the turns of said coil increases in said second portion.

8. An apparatus as set forth in claim 2, wherein said wiggler means comprises a helical coil having a longitudinal axis with first and second coil portions being positioned along said longitudinal axis, and wherein the pitch of the turns of said coil decreases in said first portion and the pitch of the turns of said coil increases in said second portion.

9. A method of separating chemical elements or isotopes thereof having differing charge-to-mass ratios, said method comprising the steps of:

(a) generating a static, uniform, first magnetic field;

(b) generating a static, non-uniform twisted second magnetic field;

(c) generating a stream of ions of said chemical elements or isotopes thereof, and passing said stream of ions through said first and second static magnetic fields, whereby, ions of different charge-to-mass ratio travel along different paths and wherein said second magnetic fields does not change the energy level of said ions: and (d) collecting ions traveling along at least one of the paths.

10. A method as set forth in claim 9, wherein the magnetic field resulting from the combination of the first and second magnetic fields is approximately
$\vec{B}(x,y,z) = B_o \hat{e}_z + B_\perp(z)(\hat{e}_y \sin kz + \hat{e}_x \cos kz)$ where: x,y,z are cartesian coordinates, $\hat{e}_x, \hat{e}_y, \hat{e}_z$ are unit vectors, and $k = 2\pi/\lambda$ where $\lambda$ is the period of the magnetic field.

$B_o$ = magnitude of the first magnetic field $B_\perp(z)$ = magnitude of the second magnetic field.

11. A method as set forth in claim 9, wherein the first and second magnetic fields are coaxial in at least one dimension thereof.

12. An apparatus as set forth in claim 3, wherein said collector means comprises a plate positioned at an end of said tubular means.

13. An apparatus as set forth in claim 3, wherein said collector means comprises said tubular means.

14. An apparatus as set forth in claim 13, wherein said collector means further includes a plate positioned at the end of said tubular means.

* * * * *

UNITED STATES PATENT AND TRADEMARK OFFICE
CERTIFICATE OF CORRECTION

PATENT NO. : 4,755,671

DATED : July 5, 1988

INVENTOR(S) : Lazar Friedland, et. al.

It is certified that error appears in the above-identified patent and that said Letters Patent is hereby corrected as shown below:

On the Title page, "14 claims, no drawings" should read -- 14 claims, 6 drawings--.

Signed and Sealed this

Twenty-second Day of November, 1994

Attest:

BRUCE LEHMAN

Attesting Officer

Commissioner of Patents and Trademarks